(12) United States Patent
Hemphill et al.

(10) Patent No.: US 9,587,727 B2
(45) Date of Patent: Mar. 7, 2017

(54) TRANSMISSION WITH DUAL INPUT AND OUTPUT SHAFTS

(71) Applicant: Schaeffler Technologies AG & Co. KG, Herzogenaurach (DE)

(72) Inventors: Jeffrey Hemphill, Copley, OH (US); David Smith, Wadsworth, OH (US); Edmund Maucher, Jeromesville, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/631,416

(22) Filed: Feb. 25, 2015

(65) Prior Publication Data

US 2016/0245382 A1    Aug. 25, 2016

(51) Int. Cl.
| | |
|---|---|
| *F16H 37/08* | (2006.01) |
| *F16H 3/00* | (2006.01) |
| *F16H 3/08* | (2006.01) |
| *F16H 3/085* | (2006.01) |
| *F16H 3/14* | (2006.01) |
| *F16H 3/093* | (2006.01) |
| *B60K 17/08* | (2006.01) |
| *B60K 17/34* | (2006.01) |

(52) U.S. Cl.
CPC ......... *F16H 37/0806* (2013.01); *B60K 17/08* (2013.01); *B60K 17/34* (2013.01); *F16H 3/006* (2013.01); *F16H 3/08* (2013.01); *F16H 3/085* (2013.01); *F16H 3/093* (2013.01); *F16H 3/14* (2013.01); *F16H 2200/006* (2013.01); *F16H 2200/0069* (2013.01); *F16H 2200/0078* (2013.01); *F16H 2200/0091* (2013.01); *F16H 2702/04* (2013.01); *F16H 2720/04* (2013.01)

(58) Field of Classification Search
None
See application file for complete search history.

(56) References Cited

U.S. PATENT DOCUMENTS

| | | | | |
|---|---|---|---|---|
| 4,294,137 A | * | 10/1981 | Piret | F16H 37/021 475/206 |
| 4,304,150 A | * | 12/1981 | Lupo | F16H 37/021 474/11 |
| 6,634,986 B2 | * | 10/2003 | Kima | B60K 6/365 475/5 |

(Continued)

OTHER PUBLICATIONS

U.S. Appl. No. 14/534,584, filed Nov. 6, 2014; Inventors: Hemphill et al.

*Primary Examiner* — Dirk Wright
(74) *Attorney, Agent, or Firm* — Simpson & Simpson, PLLC

(57) ABSTRACT

A transmission including first and second input shafts rotatable about a first axis of rotation; at least one output shaft rotatable about at least one second axis of rotation, the at least one second axis of rotation non-collinear with the first axis of rotation; a plurality of lay shafts; a plurality of gears; and a plurality of half synchronizer clutches arranged to non-rotatably connect at least a portion of the plurality of gears to the plurality of lay shafts to transmit respective torque from the first and second input shafts to the at least one output shaft and disconnect the at least a portion of the plurality of gears from the plurality of lay shafts.

20 Claims, 12 Drawing Sheets

(56) References Cited

U.S. PATENT DOCUMENTS

| | | | | |
|---|---|---|---|---|
| 7,066,043 B2* | 6/2006 | Kim | ............ | F16H 3/006 |
| | | | | 74/330 |
| 7,225,696 B2* | 6/2007 | Gitt | ............ | F16H 3/006 |
| | | | | 74/329 |
| 7,340,973 B2* | 3/2008 | Hiraiwa | ............ | F16D 21/04 |
| | | | | 74/330 |
| 8,220,352 B2* | 7/2012 | Ross | ............ | F16H 3/006 |
| | | | | 74/330 |
| 8,336,410 B2* | 12/2012 | Ross | ............ | F16H 3/006 |
| | | | | 74/330 |
| 8,622,862 B2* | 1/2014 | Koyama | ............ | B60K 6/36 |
| | | | | 180/65.21 |
| 8,632,438 B2* | 1/2014 | Kuroda | ............ | B60K 6/48 |
| | | | | 477/5 |
| 8,700,242 B2* | 4/2014 | Kanamori | ............ | B60K 6/48 |
| | | | | 180/65.265 |
| 2012/0259496 A1* | 10/2012 | Ikegami | ............ | B60K 6/365 |
| | | | | 701/22 |

* cited by examiner

TRANSMISSION WITH DUAL INPUT AND OUTPUT SHAFTS

TECHNICAL FIELD

The present disclosure relates to a transmission with a dual input and a reduced size and footprint, in particular with a reduced number of shafts, specifically, including an idler gear, for reverse gear ratios, non-rotatably connected to a lay shaft used for forward gear ratios.

BACKGROUND

FIG. 10 is a schematic block diagram of a typical prior art front-wheel drive power train 1000. Note that not all components needed for the power train are shown. Power train 1000 includes engine 1002, dual clutch input 1004, transmission 1006, output gear 1008, differential gear 1010 with a final drive ratio, universal joints 1012, and front wheels 1014. Transmission 1006 includes output shaft 1016 connected to gear 1008. Torque is transmitted from engine 1002 to wheels 1014 via the transmission, gear 1008 and gear 1010. Since there is only one output shaft in transmission 1006, differential gear 1008 is needed to split torque from the transmission to the front wheels. The differential must be off-set from the transmission in direction D, increasing the space needed for train 1000 in direction D. However, it is desirable to reduce the space needed for train 1000.

FIG. 11 is a schematic block diagram of a prior art rear-wheel drive power train 1100. Note that not all components needed for the power train are shown. For example, universal joints may be needed for portions of the power train. Power train 1100 includes engine 1102, dual clutch input 1104, transmission 1106, output gear 1108, differential gear 1110 with a final drive ratio, universal joints 1112, and front wheels 1114. Transmission 1106 includes output shaft 1116 connected to gear 1108. Torque is transmitted from engine 1102 to wheels 1114 via the transmission, gear 1108, gear 1110 and drive shaft 1118.

FIG. 12 is a schematic block diagram of a prior art all-wheel drive power train 1200. Note that not all components needed for the power train are shown. Power train 1200 includes engine 1202, dual clutch input 1204, transmission 1206, output gear 1208, transfer case 1210, front differential gear 1212 with a final drive ratio, rear differential gear 1214 with a final drive ratio, universal joints 1216, front wheels 1218, and rear wheels 1220. Transmission 1206 includes output shaft 1222 connected to gear 1208. Torque is transmitted from engine 1202 to wheels 1218 via the transmission, case 1210, and gear 1212. Torque is transmitted from engine 1202 to wheels 1220 via output shaft 1222, gear 1208, drive shaft 1224, and gear 1214.

The respective architectures for transmissions 1006, 1106, and 1206 are quite different. For example: the clutch input and the output of transmission 1006 are off-set, or non-collinear (entering and exiting respectively, the same side of the transmission), while the clutch input and the output of transmission 1106 are collinear (entering and exiting, respectively, opposite sided of the transmission); and transmission 1206 has the output shaft on one end and the transfer case on one side. Therefore, the transmissions cannot be used interchangeably. Thus, the cost and complexity of producing, installing, and servicing transmissions for front-wheel power trains, rear-wheel power trains, and all-wheel power trains is increased by the necessity to manufacture, stock, and install different transmissions for each type of power train.

SUMMARY

According to aspects illustrated herein, there is provided a transmission, including: first and second input shafts rotatable about a first axis of rotation; at least one output shaft rotatable about at least one second axis of rotation, the at least one second axis of rotation non-collinear with the first axis of rotation; a plurality of lay shafts; a plurality of gears; and a plurality of half synchronizer clutches arranged to non-rotatably connect at least a portion of the plurality of gears to the plurality of lay shafts to transmit respective torque from the first and second input shafts to the at least one output shaft and disconnect the at least a portion of the plurality of gears from the plurality of lay shafts.

According to aspects illustrated herein, there is provided a transmission including: a casing; first and second input shafts rotatable about a first axis of rotation; a plurality of lay shafts located within the casing; a plurality of gears located within the casing; a plurality of half synchronizer clutches located within the casing and arranged to non-rotatably connect at least a portion of the plurality of gears to the plurality of lay shafts and disconnect the at least a portion of the plurality of gears from the plurality of lay shafts; a differential gear assembly located within the casing; first and second output shafts; and a differential gear assembly located within the casing and arranged to transmit respective torque from the first and second input shafts to the first and second output shafts.

According to aspects illustrated herein, there is provided a transmission including: a casing; first and second input shafts rotatable about a first axis of rotation; first and second output shafts; a differential gear assembly wholly located within the casing and arranged to transmit respective torque from the first and second input shafts to the first and second output shafts; first and second planetary gears sets arranged to transmit the respective torque to the differential gear assembly; a plurality of lay shafts located within the casing and including a first lay shaft arranged to transmit the respective torque to the first planetary gears set and a second lay shaft arranged to transmit the respective torque to the second planetary gears set; and a plurality of half synchronizer clutches located within the casing and arranged to non-rotatably connect at least a portion of the plurality of gears to the plurality of lay shafts to transmit the respective torque to the plurality of lay shafts and disconnect the at least a portion of the plurality of gears from the plurality of lay shafts.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

In the discussions that follow, it should be understood that unless a clutch is described as being closed, the clutch is open. It also should be understood that in the descriptions of gear ratios, a torque path is created from one of the clutches associated with the input shafts to the output shaft or shafts through the respective gears non-rotatably connected to the respective input shaft and/or lay shaft or lay shafts.

Figure 1:
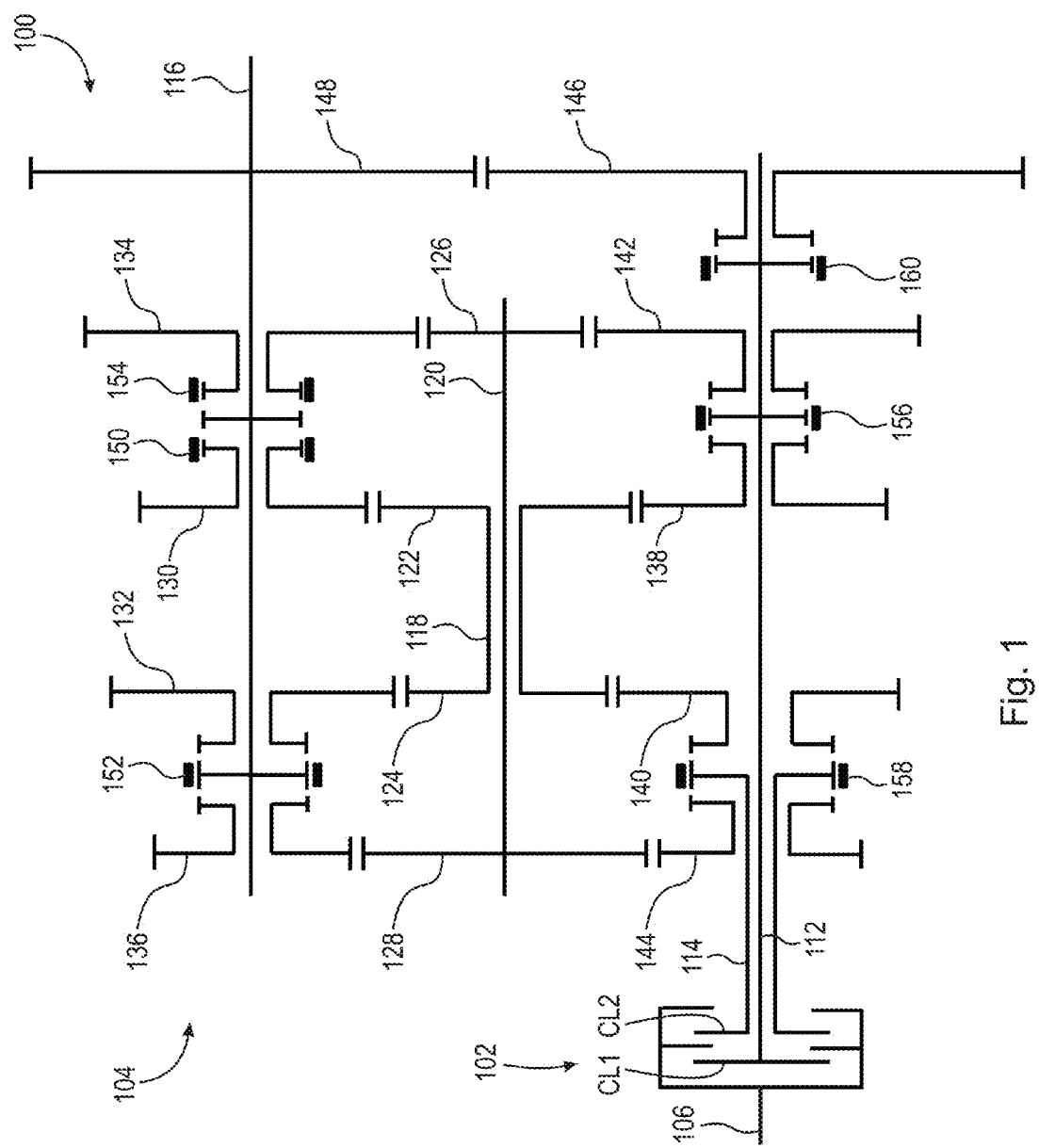
FIG. 1 is a schematic diagram of a transmission assembly with dual outputs, eight forward speeds and three reverse speeds.

FIG. 1 is a schematic diagram of a transmission assembly with dual outputs, eight forward speeds and three reverse speeds. Assembly 100 includes dual clutch assembly 102 and transmission 104. Assembly 102 includes torque input shaft 106 and clutches CL1 and CL2. Transmission 104 includes input shaft 112 connected to clutch CL1 and input shaft 114 connected to clutch CL2. When clutch CL1 is closed, torque is transmitted from shaft 106 to shaft 112 via clutch CL1. When clutch CL2 is closed, torque is transmitted from shaft 106 to shaft 114 via clutch CL2.

Transmission 104 includes: output shaft 116; lay shafts 118 and 120; gears 122 and 124 non-rotatably connected to shaft 118; gears 126 and 128 non-rotatably connected to shaft 120; and gears 130, 132, 134, 136, 138, 140, 142, 144, and 146; and reverse gear 148 non-rotatably connected to shaft 116. Transmission 104 includes: synchronizer clutches 150, 152, 154, 156, 158, and 160. By "non-rotatably connected" elements (for example two elements), we mean that the two elements are connected so that whenever the first element rotates, the second element rotates and whenever the second element rotates, the first element rotates. Radial and/or axial movement of one or both of the two elements with respect to each other is possible, but not required, when the two elements are non-rotatably connected.

Gear 122 is meshed with gears 130 and 138; gear 124 is meshed with gears 132 and 140; gear 126 is meshed with gears 134 and 142; gear 128 is meshed with gears 136 and 144; and gears 146 and 148 are meshed. By "meshed" we mean that for first and second meshed gears, rotation of the first gear about its axis or rotation caused rotation of the second gear about its axis of rotation cause and vice versa.

Clutch 150 is arranged to non-rotatably connect gear 130 to shaft 116; clutch 152 is arranged to non-rotatably connect gears 132 and 136 to shaft 116; clutch 154 is arranged to non-rotatably connect gear 134 to shaft 116; clutch 156 is arranged to non-rotatably connect gears 138 and 142 to shaft 112; clutch 158 is arranged to non-rotatably connect gears 140 and 144 to shaft 114; and clutch 160 is arranged to non-rotatably connected gear 146 to shaft 112.

Assembly 100 is arranged to provide gear ratios as follows. In the description to follows it should be understood that unless designated otherwise, a synchronizer clutch is open:

1. First forward gear ratio: Close clutch CL1. Close clutch 156 to non-rotatably connect gear 142 to shaft 112 and close clutch 152 to non-rotatably connected gear 136 to shaft 116.

2. Second forward gear ratio: Close clutch CL2. Close clutch 158 to non-rotatably connect gear 144 to shaft 114 and close clutch 152 to non-rotatably connected gear 136 to shaft 116.

3. Third forward gear ratio: Close clutch CL1. Close clutch 156 to non-rotatably connect gear 138 to shaft 112 and close clutch 150 to non-rotatably connect gear 130 to shaft 116.

4. Fourth forward gear ratio: Close clutch CL2. Close clutch 158 to non-rotatably connect gear 144 to shaft 114 and close clutch 154 to non-rotatably connect gear 134 to shaft 116.

5. Fifth forward gear ratio: Close clutch CL1. Close clutch 156 to non-rotatably connect gear 138 to shaft 112 and close clutch 152 to non-rotatably connected gear 132 to shaft 116.

6. Sixth forward gear ratio: Close clutch CL2. Close clutch 158 to non-rotatably connect gear 140 to shaft 114 and close clutch 152 to non-rotatably connected gear 132 to shaft 116.

7. Seventh forward gear ratio: Close clutch CL1. Close clutch 156 to non-rotatably connect gear 142 to shaft 114 and close clutch 154 to non-rotatably connect gear 134 to shaft 116.

8. Eighth forward gear ratio: Close clutch CL2. Close clutch 158 to non-rotatably connect gear 140 to shaft 114 and close clutch 150 to non-rotatably connect gear 130 to shaft 116.

9. First reverse gear ratio: Close clutch CL2. Close clutch 158 to non-rotatably connect gear 144 to shaft 112, close clutch 156 to non-rotatably connected gear 142 to shaft 112 and close clutch 160 to non-rotatably connect gear 146 to shaft 112.

10. Second reverse gear ratio: Close clutch CL1. Close clutch 160 to non-rotatably connect gear 146 to shaft 112.

11. Third reverse gear ratio: Close clutch CL2. Close clutch 158 to non-rotatably connect gear 140 to shaft 114, close clutch 156 to non-rotatably connected gear 138 to shaft 112 and close clutch 160 to non-rotatably connect gear 146 to shaft 112.

Figure 2:
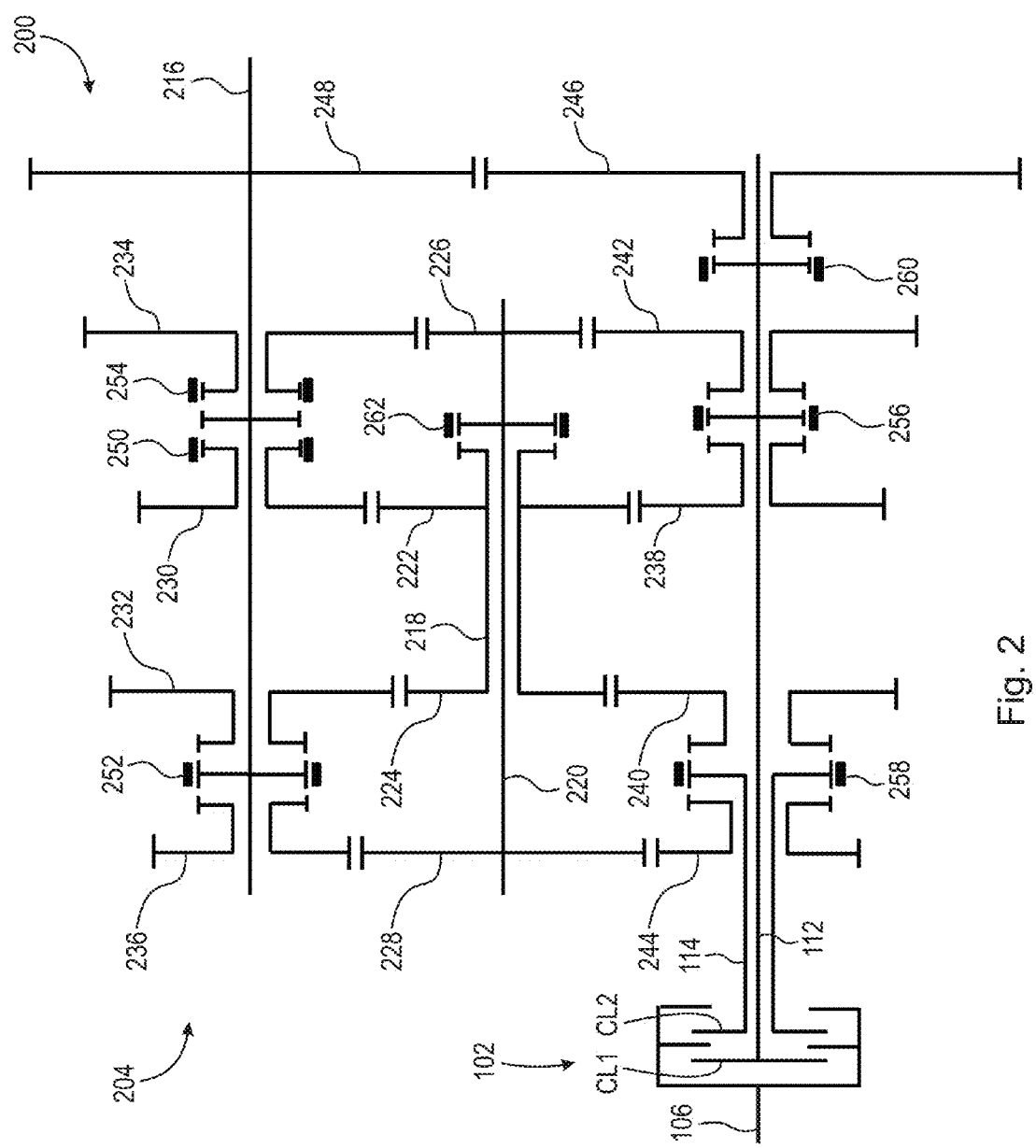
FIG. 2 is a schematic diagram of a transmission assembly with dual outputs, ten forward speeds and three reverse speeds.

FIG. 2 is a schematic diagram of a transmission with dual outputs, ten forward speeds and three reverse speeds. Assembly 200 includes dual clutch assembly 102 and transmission 104. Transmission 104 includes input shaft 112 connected to clutch CL1 and input shaft 114 connected to clutch CL2. When clutch CL1 is closed, torque is transmitted from shaft 106 to shaft 112 via clutch CL1. When clutch CL2 is closed, torque is transmitted from shaft 106 to shaft 114 via clutch CL2.

Transmission 204 includes: output shaft 216; lay shafts 218 and 220; gears 222 and 224 non-rotatably connected to shaft 218; gears 226 and 228 non-rotatably connected to shaft 220; and gears 230, 232, 234, 236, 238, 240, 242, 244, and 246; and reverse gear 248 non-rotatably connected to shaft 216. Transmission 204 includes: synchronizer clutches 250, 252, 254, 256, 258, and 260.

Gear 222 is meshed with gears 230 and 238; gear 224 is meshed with gears 232 and 240; gear 226 is meshed with gears 234 and 242; gear 228 is meshed with gears 236 and 244; and gears 246 and 248 are meshed.

Clutch 250 is arranged to non-rotatably connect gear 230 to shaft 216; clutch 252 is arranged to non-rotatably connect gears 232 and 236 to shaft 216; clutch 254 is arranged to non-rotatably connect gear 234 to shaft 216; clutch 256 is arranged to non-rotatably connect gears 238 and 242 to shaft 212; clutch 258 is arranged to non-rotatably connect gears 240 and 244 to shaft 114; and clutch 260 is arranged to non-rotatably connected gear 246 to shaft 212. Synchronizer clutch 262 is arranged to non-rotatably connect lay shafts 218 and 220.

Assembly 200 is arranged to provide gear ratios as follows. In the description to follows it should be understood that unless designated otherwise, a half synchronizer clutch is open:

1. First forward gear ratio: Close clutch CL1. Close clutch 256 to non-rotatably connect gear 242 to shaft 112 and close clutch 252 to non-rotatably connected gear 236 to shaft 216.

2. Second forward gear ratio: Close clutch CL2. Close clutch 258 to non-rotatably connect gear 244 to shaft 114 and close clutch 252 to non-rotatably connected gear 236 to shaft 216.

3. Third forward gear ratio: Close clutch CL1. Close clutch 256 to non-rotatably connect gear 238 to shaft 112 and close clutch 250 to non-rotatably connect gear 230 to shaft 216.

4. Fourth forward gear ratio: Close clutch CL2. Close clutch 258 to non-rotatably connect gear 244 to shaft 114 and close clutch 254 to non-rotatably connect gear 234 to shaft 216.

5. Fifth forward gear ratio: Close clutch CL1. Close clutch 256 to non-rotatably connect gear 238 to shaft 112 and close clutch 252 to non-rotatably connected gear 232 to shaft 216.

6. Sixth forward gear ratio: Close clutch CL2. Close clutch 258 to non-rotatably connect gear 240 to shaft 114 and close clutch 252 to non-rotatably connected gear 232 to shaft 116.

7. Seventh forward gear ratio: Close clutch CL1. Close clutch 256 to non-rotatably connect gear 242 to shaft 114 and close clutch 254 to non-rotatably connect gear 234 to shaft 216.

8. Eighth forward gear ratio: Close clutch CL2. Close clutch 258 to non-rotatably connect gear 240 to shaft 114 and close clutch 250 to non-rotatably connect gear 230 to shaft 216.

9. Ninth forward gear ratio: Close clutch CL1. Close clutch 256 to non-rotatably connect gear 242 to shaft 212, close clutch 262 to non-rotatably connect shafts 218 and 220, and close clutch 250 to non-rotatably connect gear 230 to shaft 216.

10. Tenth forward gear ratio: Close clutch CL2. Close clutch 258 to non-rotatably connect gear 244 to shaft 114, close clutch 262 to non-rotatably connect gear 226 to shaft 218, and close clutch 250 to non-rotatably connect gear 230 to shaft 216.

11. First reverse gear ratio: Close clutch CL2. Close clutch 258 to non-rotatably connect gear 244 to shaft 212, close clutch 256 to non-rotatably connected gear 242 to shaft 112 and close clutch 260 to non-rotatably connect gear 246 to shaft 212.

12. Second reverse gear ratio: Close clutch CL1. Close clutch 260 to non-rotatably connect gear 246 to shaft 212.

13. Third reverse gear ratio: Close clutch CL2. Close clutch 258 to non-rotatably connect gear 240 to shaft 114, close clutch 256 to non-rotatably connected gear 238 to shaft 112 and close clutch 260 to non-rotatably connect gear 246 to shaft 212.

Figure 3:
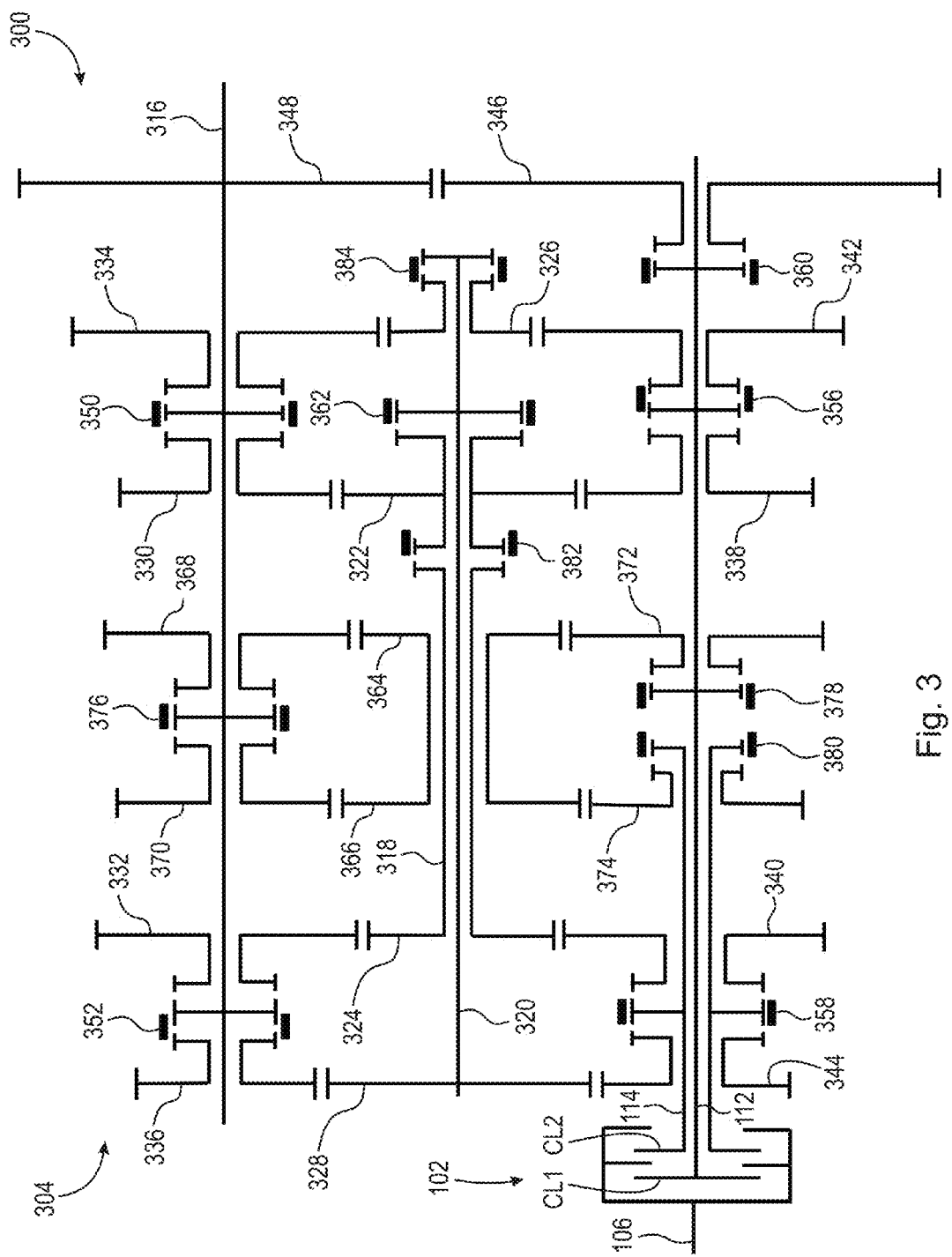
FIG. 3 is a schematic diagram of a transmission assembly with dual outputs, 16 forward speeds and three reverse speeds.

FIG. 3 is a schematic diagram of a transmission with dual outputs, 16 forward speeds and three reverse speeds. Assembly 300 includes dual clutch assembly 102 and transmission 304. Transmission 104 includes input shaft 112 connected to clutch CL1 and input shaft 114 connected to clutch CL2. When clutch CL1 is closed, torque is transmitted from shaft 106 to shaft 112 via clutch CL1. When clutch CL2 is closed, torque is transmitted from shaft 106 to shaft 114 via clutch CL2.

Transmission 304 includes: output shaft 316; lay shafts 318 and 320; gears 322 and 324 non-rotatably connected to shaft 318; gears 326 and 328 non-rotatably connected to shaft 320; and gears 330, 332, 334, 336, 338, 340, 342, 344, and 346; and reverse gear 348 non-rotatably connected to shaft 316. Transmission 304 includes: synchronizer clutches 350, 352, 356, 358, and 360.

Gear 322 is meshed with gears 330 and 338; gear 324 is meshed with gears 332 and 340; gear 326 is meshed with gears 334 and 342; gear 328 is meshed with gears 336 and 344; and gears 346 and 348 are meshed.

Clutch 350 is arranged to non-rotatably connect gears 330 and 334 to shaft 316; clutch 352 is arranged to non-rotatably connect gears 332 and 336 to shaft 316; clutch 356 is arranged to non-rotatably connect gears 338 and 342 to shaft 312; clutch 358 is arranged to non-rotatably connect gears 340 and 344 to shaft 314; and clutch 360 is arranged to non-rotatably connected gear 346 to shaft 312. Synchronizer clutch 362 is arranged to non-rotatably connect lay shafts 318 and 320.

Transmission 304 includes: gears 364 and 366 non-rotatably connected to shaft 318; and gears 368, 370, 372, and 374, Transmission 304 includes: synchronizer clutches 376, 378, 380, 382 and 384. Gear 364 is meshed with gears 368 and 372; gear 366 is meshed with gears 370 and 374. Clutch 376 is arranged to non-rotatably connect gears 368 and 370 to shaft 316; clutch 378 is arranged to non-rotatably connect gear 372 to shaft 312; clutch 380 is arranged to non-rotatably connected gear 374 to shaft 314. Clutch 382 is arranged to non-rotatably connect gear 322 to shaft 318 and clutch 384 is arranged to non-rotatably gear 326 to shaft 320.

Assembly 300 is arranged to provide gear ratios as follows. In the description to follows it should be understood that unless designated otherwise, a synchronizer clutch is open:

1. First forward gear ratio: Close clutch CL1. Close clutch 356 to non-rotatably connect gear 342 to shaft 312, close clutch 384 to non-rotatably connected gear 326 to shaft 320 and close clutch 352 to non-rotatably connected gear 336 to shaft 316.

2. Second forward gear ratio: Close clutch CL2. Close clutch 358 to non-rotatably connect gear 344 to shaft 114 and close clutch 352 to non-rotatably connected gear 336 to shaft 316.

3. Third forward gear ratio: Close clutch CL1. Close clutch 356 to non-rotatably connect gear 342 to shaft 112 and close clutch 350 to non-rotatably connect gear 334 to shaft 316.

4. Fourth forward gear ratio: Close clutch CL2. Close clutch 358 to non-rotatably connect gear 344 to shaft 314, close clutch 384 to non-rotatably connected gear 326 to shaft 320 and close clutch 350 to non-rotatably connect gear 334 to shaft 316.

5. Fifth forward gear ratio: Close clutch CL1. Close clutch 356 to non-rotatably connect gear 338 to shaft 312, close clutch 382 to non-rotatably connected gear 322 to shaft 318 and close clutch 352 to non-rotatably connected gear 332 to shaft 316.

6. Sixth forward gear ratio: Close clutch CL2. Close clutch 358 to non-rotatably connect gear 340 to shaft 114 and close clutch 352 to non-rotatably connected gear 332 to shaft 316.

7. Seventh forward gear ratio: Close clutch CL1. Close clutch 356 to non-rotatably connect gear 338 to shaft 112 and close clutch 350 to non-rotatably connect gear 330 to shaft 316.

8. Eighth forward gear ratio: Close clutch CL2. Close clutch 358 to non-rotatably connect gear 340 to shaft 314, close clutch 382 to non-rotatably connected gear 322 to shaft 318 and close clutch 350 to non-rotatably connect gear 330 to shaft 316.

9. Ninth forward gear ratio: Close clutch CL1. Close clutch 356 to non-rotatably connect gear 342 to shaft 312, close clutch 362 to non-rotatably connect shafts 318 and 320, close clutch 384 to non-rotatably connected gear 326 to shaft 320 and close clutch 350 to non-rotatably connect gear 330 to shaft 316.

10. Tenth forward gear ratio: Close clutch CL2. Close clutch 358 to non-rotatably connect gear 344 to shaft 114, close clutch 362 to non-rotatably connect gear 322 to shaft 320, and close clutch 350 to non-rotatably connect gear 330 to shaft 316.

11. Eleventh forward gear ratio: Close clutch CL1. Close clutch 378 to non-rotatably connect gear 372 to shaft 112 and close clutch 376 to non-rotatably connected gear 370 to shaft 316.

12. Twelfth forward gear ratio: Close clutch CL2. Close clutch 380 to non-rotatably connect gear 374 to shaft 114 and close clutch 376 to non-rotatably connected gear 370 to shaft 316.

13. Thirteenth forward gear ratio: Close clutch CL1. Close clutch 356 to non-rotatably connect gear 338 to shaft 312, close clutch 382 to non-rotatably connected gear 322 to shaft 318 and close clutch 352 to non-rotatably connect gear 332 to shaft 316.

14. Fourteenth forward gear ratio: Close clutch CL2. Close clutch 358 to non-rotatably connect gear 344 to shaft 314, close clutch 382 to non-rotatably connected gear 322 to shaft 318, close clutch 362 to non-rotatably connect gear 326 to shaft 318 and close clutch 352 to non-rotatably connect gear 332 to shaft 316.

15. Fifteenth forward gear ratio: Close clutch CL1. Close clutch 378 to non-rotatably connect gear 372 to shaft 3127 and close clutch 376 to non-rotatably connect gear 368 to shaft 316.

16. Sixteenth forward gear ratio: Close clutch CL2. Close clutch 380 to non-rotatably connect gear 344 to shaft 114 and close clutch 376 to non-rotatably connect gear 368 to shaft 316.

17. First reverse gear ratio: Close clutch CL2. Close clutch 358 to non-rotatably connect gear 344 to shaft 312, close clutch 384 to non-rotatably connected gear 326 to shaft 320, close clutch 356 to non-rotatably connected gear 342 to shaft 112 and close clutch 360 to non-rotatably connect gear 346 to shaft 312.

18. Second reverse gear ratio: Close clutch CL1. Close clutch 360 to non-rotatably connect gear 346 to shaft 312.

19. Third reverse gear ratio: Close clutch CL2. Close clutch 358 to non-rotatably connect gear 340 to shaft 314, close clutch 382 to non-rotatably connected gear 322 to shaft 318, close clutch 356 to non-rotatably connected gear 338 to shaft 112 and close clutch 360 to non-rotatably connect gear 346 to shaft 312.

Figure 4:
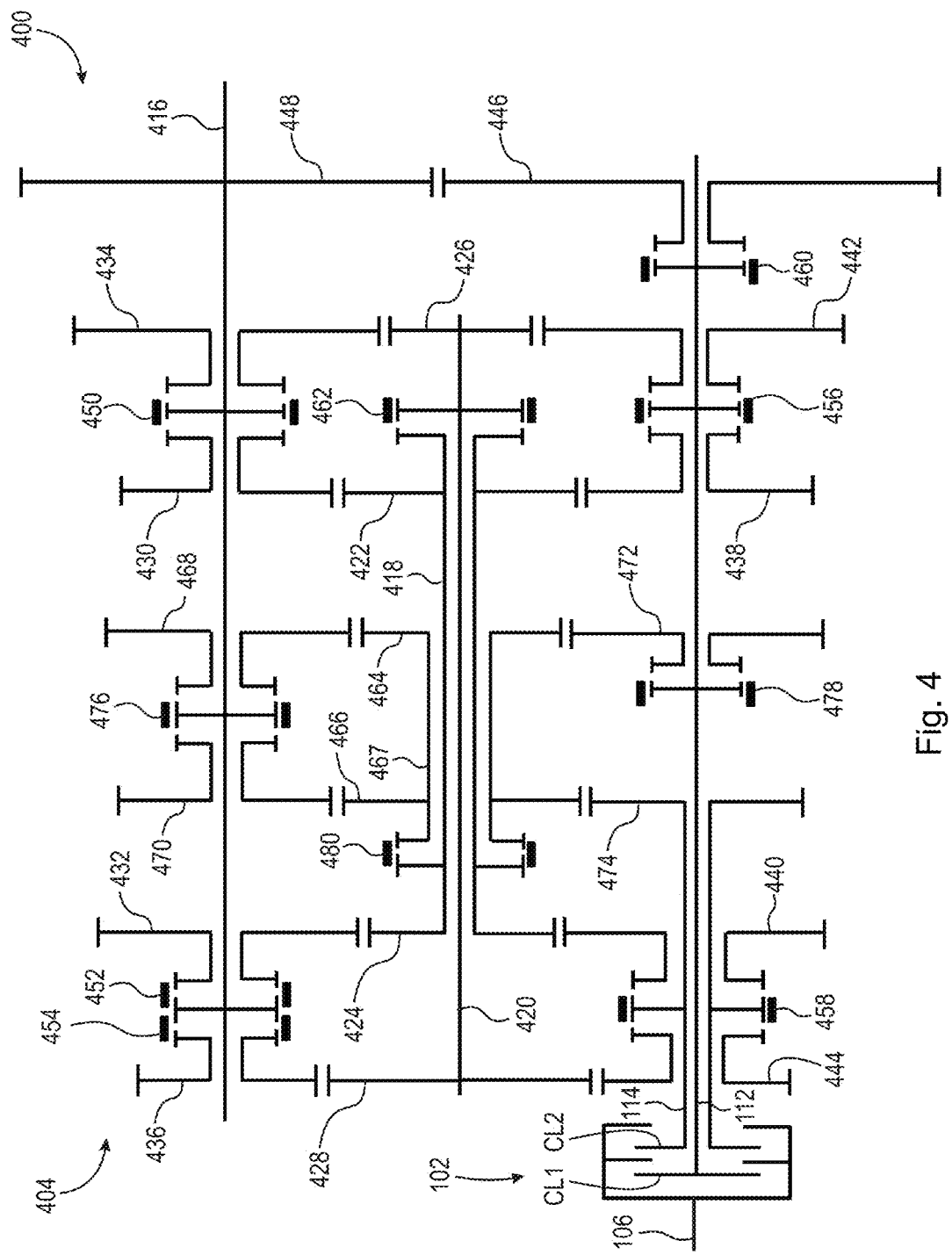
FIG. 4 is a schematic diagram of a transmission assembly with dual outputs, 16 forward speeds and three reverse speeds.

FIG. 4 is a schematic diagram of a transmission with dual outputs, 16 forward speeds and three reverse speeds. Assembly 400 includes dual clutch assembly 102 and transmission 404. Transmission 404 includes input shaft 112 connected to clutch CL1 and input shaft 114 connected to clutch CL2. When clutch CL1 is closed, torque is transmitted from shaft 106 to shaft 112 via clutch CL1. When clutch CL2 is closed, torque is transmitted from shaft 106 to shaft 114 via clutch CL2.

Transmission 404 includes: output shaft 416; lay shafts 418 and 420; gears 422 and 424 non-rotatably connected to shaft 418; gears 426 and 428 non-rotatably connected to shaft 420; gears 430, 432, 434, 436, 438, 440, 442, 444, and 446; and reverse gear 448 non-rotatably connected to shaft 416. Transmission 404 includes: synchronizer clutches 450, 452, 454, 456, 458, and 460.

Gear 422 is meshed with gears 430 and 438; gear 424 is meshed with gears 432 and 440; gear 426 is meshed with gears 434 and 442; gear 428 is meshed with gears 436 and 444; and gears 446 and 448 are meshed.

Clutch 450 is arranged to non-rotatably connect gears 430 and 434 to shaft 416; clutch 452 is arranged to non-rotatably connect gear 432 to shaft 416; clutch 454 is arranged to non-rotatably connect gear 436 to shaft 416; clutch 456 is arranged to non-rotatably connect gears 438 and 442 to shaft 112; clutch 458 is arranged to non-rotatably connect gears 440 and 444 to shaft 114; and clutch 460 is arranged to non-rotatably connected gear 446 to shaft 112. Synchronizer clutch 462 is arranged to non-rotatably connect lay shafts 418 and 420.

Transmission 404 includes: gears 464, 466, 472 and 474 non-rotatably connected to lay shaft 467. Transmission 404 includes: synchronizer clutches 476, 478 and 480. Gear 464 is meshed with gears 468 and 472; gear 466 is meshed with gears 470 and 474. Clutch 476 is arranged to non-rotatably connect gears 468 and 470 to shaft 416; clutch 478 is arranged to non-rotatably connect gear 472 to shaft 112; and clutch 480 is arranged to non-rotatably connect shafts 418 and 467.

Assembly 400 is arranged to provide gear ratios as follows. In the description that follows it should be understood that unless designated otherwise, a synchronizer clutch is open.

1. First forward gear ratio: Close clutch CL2. Close clutch 480 to non-rotatably connect shafts 418 and 467 and close clutch 452 to non-rotatably connected gear 432 to shaft 416.

2. Second forward gear ratio: Close clutch CL1. Close clutch 456 to non-rotatably connect gear 442 to shaft 112 and close clutch 454 to non-rotatably connected gear 436 to shaft 416.

3. Third forward gear ratio: Close clutch CL2. Close clutch 458 to non-rotatably connect gear 440 to shaft 114, close clutch 480 to non-rotatably connect shafts 418 and 467 and close clutch 476 to non-rotatably connect gear 468 to shaft 416.

4. Fourth forward gear ratio: Close clutch CL1. Close clutch 456 to non-rotatably connect gear 442 to shaft 112 and close clutch 450 to non-rotatably connect gear 434 to shaft 416.

5. Fifth forward gear ratio: Close clutch CL2. Close clutch 458 to non-rotatably connect gear 440 to shaft 114 and close clutch 450 to non-rotatably connected gear 430 to shaft 416.

6. Sixth forward gear ratio: Close clutch CL1. Close clutch 478 to non-rotatably connect gear 472 to shaft 112 and close clutch 476 to non-rotatably connect gear 470 to shaft 416.

7. Seventh forward gear ratio: Close clutch CL2. Close clutch 458 to non-rotatably connect gear 440 to shaft 114, close clutch 462 to non-rotatably connect shafts 418 and 420, and close clutch 450 to non-rotatably connect gear 434 to shaft 416.

8. Eighth forward gear ratio: Close clutch CL1. Close clutch 478 to non-rotatably connect gear 472 to shaft 112 and close clutch 476 to non-rotatably connect gear 468 to shaft 416.

9. Ninth forward gear ratio: Close clutch CL2. Close clutch 458 to non-rotatably connect gear 444 to shaft 114 and close clutch 450 to non-rotatably connect gear 434 to shaft 416.

10. Tenth forward gear ratio: Close clutch CL1. Close clutch 456 to non-rotatably connect gear 438 to shaft 112, close clutch 480 to non-rotatably connect shafts 418 and 467 and close clutch 476 to non-rotatably connect gear 470 to shaft 416.

11. Eleventh forward gear ratio: Close clutch CL2. Close clutch 458 to non-rotatably connect gear 444 to shaft 114 and close clutch 454 to non-rotatably connected gear 436 to shaft 416.

12. Twelfth forward gear ratio: Close clutch CL1. Close clutch 456 to non-rotatably connect gear 438 to shaft 112 and close clutch 450 to non-rotatably connected gear 430 to shaft 416.

13. Thirteenth forward gear ratio: Close clutch CL2. Close clutch 476 to non-rotatably connect gear 470 to shaft 416.

14. Fourteenth forward gear ratio: Close clutch CL1. Close clutch 456 to non-rotatably connect gear 438 to shaft 112, close clutch 462 to non-rotatably connected shafts 418 and 420 and close clutch 450 to non-rotatably connect gear 434 to shaft 416.

15. Fifteenth forward gear ratio: Close clutch CL2. Close clutch 476 to non-rotatably connect gear 468 to shaft 416.

16. Sixteenth forward gear ratio: Close clutch CL1. Close clutch 456 to non-rotatably connect gear 438 to shaft 112 and close clutch 476 to non-rotatably connect gear 468 to shaft 416.

17. First reverse gear ratio: Close clutch CL2. Close clutch 458 to non-rotatably connect gear 444 to shaft 114, close clutch 456 to non-rotatably connected gear 442 to shaft 112, and close clutch 460 to non-rotatably connect gear 446 to shaft 112.

18. Second reverse gear ratio: Close clutch CL1. Close clutch 460 to non-rotatably connect gear 446 to shaft 112.

19. Third reverse gear ratio: Close clutch CL2. Close clutch 456 to non-rotatably connect gear 438 to shaft 114 and close clutch 460 to non-rotatably connect gear 446 to shaft 112.

Figure 5:
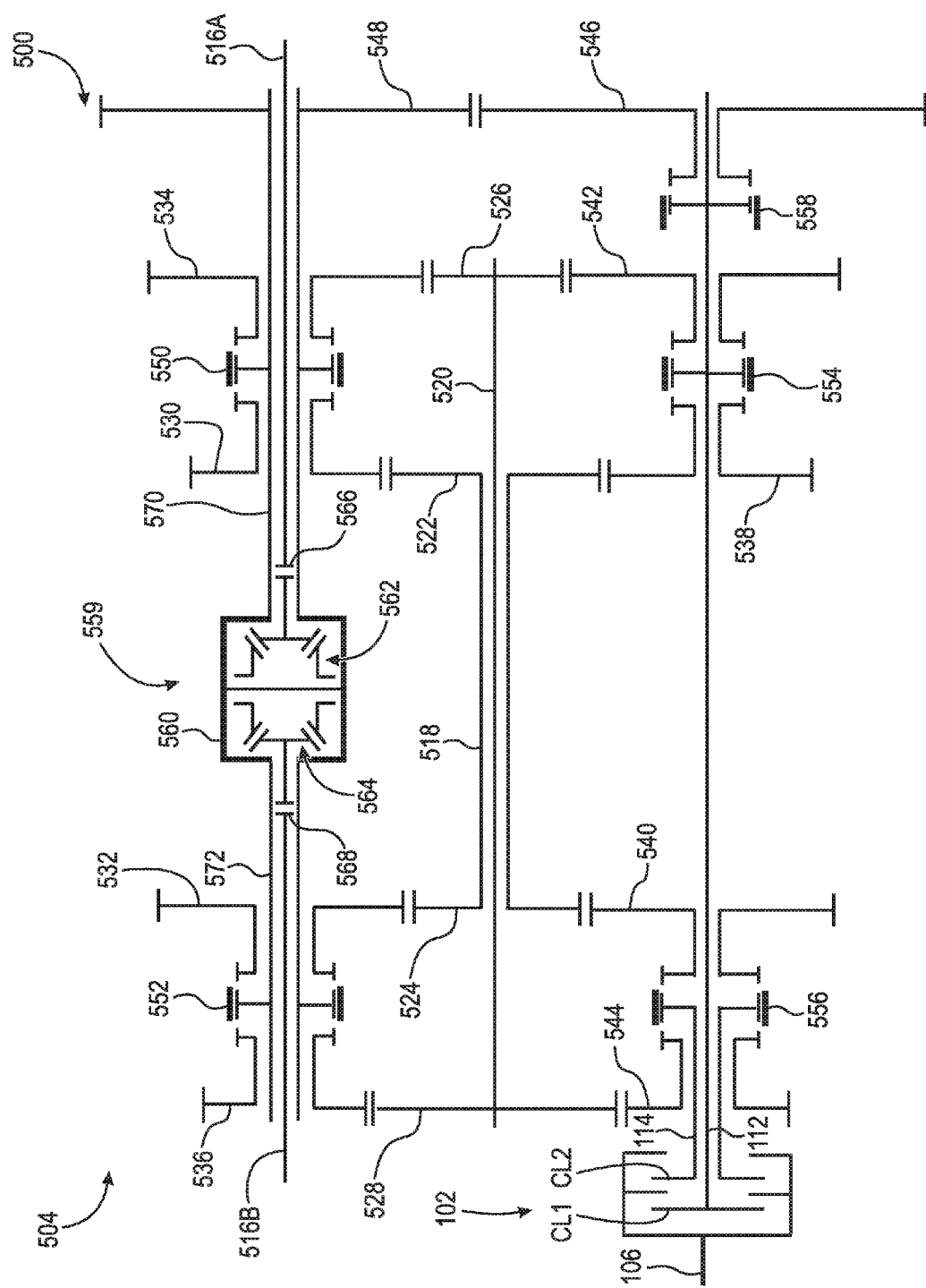
FIG. 5 is a schematic diagram of a transmission assembly with dual outputs, an on-board differential gear assembly, eight forward speeds and three reverse speeds.

FIG. 5 is a schematic diagram of a transmission assembly with dual outputs, an on-board differential gear assembly, eight forward speeds and three reverse speeds. Assembly 500 includes dual clutch assembly 102 and transmission 504.

Assembly 500 includes dual clutch assembly 102 and transmission 504. Transmission 504 includes input shaft 112 connected to clutch CL1 and input shaft 114 connected to clutch CL2. When clutch CL1 is closed, torque is transmitted from shaft 106 to shaft 112 via clutch CL1. When clutch CL2 is closed, torque is transmitted from shaft 106 to shaft 114 via clutch CL2.

Transmission 504 includes: output shafts 516A and 516B; lay shafts 518, 520, 570, and 572; gears 522 and 524 non-rotatably connected to shaft 518; gears 526 and 528 non-rotatably connected to shaft 520; gears 530, 532, 534, 536, 538, 540, 542, 544, and 546; and reverse gear 548 non-rotatably connected to shaft 570. Transmission 504 includes: synchronizer clutches 550, 552, 554, 556, and 558.

Gear 522 is meshed with gears 530 and 538; gear 524 is meshed with gears 532 and 540; gear 526 is meshed with gears 534 and 542; gear 528 is meshed with gears 536 and 544; and gears 546 and 548 are meshed.

Clutch 550 is arranged to non-rotatably connect gears 530 and 534 to shaft 570; clutch 552 is arranged to non-rotatably connect gears 532 and 536 to shaft 572; clutch 554 is arranged to non-rotatably connect gears 538 and 542 to shaft 112; clutch 556 is arranged to non-rotatably connect gears 540 and 544 to shaft 114; and clutch 558 is arranged to non-rotatably connected gear 546 to shaft 112.

Transmission 504 includes: differential 559 with casing 560 driven by shafts 570 and 572; planetary gear sets 562 and 564; and gears 566 and 568 arranged to drive shafts 516A and 516B, respectively. Thus, torque applied to either of shafts 570 or 572 is transmitted to both of shafts 516A and 516B via differential 559.

Assembly 500 is arranged to provide gear ratios as follows. In the description that follows it should be understood that unless designated otherwise, a synchronizer clutch is open.

1. First forward gear ratio: Close clutch CL1. Close clutch 554 to non-rotatably connect gear 542 to shaft 112 and close clutch 552 to non-rotatably connected gear 536 to shaft 572.

2. Second forward gear ratio: Close clutch CL2. Close clutch 556 to non-rotatably connect gear 544 to shaft 114 and close clutch 552 to non-rotatably connected gear 536 to shaft 572.

3. Third forward gear ratio: Close clutch CL1. Close clutch 554 to non-rotatably connect gear 542 to shaft 112 and close clutch 550 to non-rotatably connected gear 534 to shaft 570.

4. Fourth forward gear ratio: Close clutch CL2. Close clutch 556 to non-rotatably connect gear 544 to shaft 114 and close clutch 550 to non-rotatably connected gear 534 to shaft 570.

5. Fifth forward gear ratio: Close clutch CL1. Close clutch 554 to non-rotatably connect gear 538 to shaft 112 and close clutch 552 to non-rotatably connected gear 532 to shaft 572.

6. Sixth forward gear ratio: Close clutch CL2. Close clutch 556 to non-rotatably connect gear 540 to shaft 114 and close clutch 552 to non-rotatably connected gear 532 to shaft 572.

7. Seventh forward gear ratio: Close clutch CL1. Close clutch 554 to non-rotatably connect gear 538 to shaft 112 and close clutch 550 to non-rotatably connected gear 530 to shaft 570.

8. Eighth forward gear ratio: Close clutch CL2. Close clutch 556 to non-rotatably connect gear 540 to shaft 114 and close clutch 550 to non-rotatably connected gear 530 to shaft 570.

9. First reverse gear ratio: Close clutch CL2. Close clutch 556 to non-rotatably connect gear 544 to shaft 114, close clutch 554 to non-rotatably connect gear 542 to shaft 112, and close clutch 558 to non-rotatably connect gear 546 to shaft 112 and close clutch 550 to non-rotatably connected gear 534 to shaft 570.

10. Second reverse gear ratio: Close clutch CL1. Close clutch 556 to non-rotatably connect gear 544 to shaft 114, close clutch 558 to non-rotatably connect gear 546 to shaft 112, and close clutch 550 to non-rotatably connected gear 534 to shaft 570.

11. Third reverse gear ratio: Close clutch CL2. Close clutch 556 to non-rotatably connect gear 540 to shaft 114, close clutch 554 to non-rotatably connect gear 538 to shaft 112, and close clutch 558 to non-rotatably connect gear 546 to shaft 112 and close clutch 550 to non-rotatably connected gear 534 to shaft 570.

Figure 6:
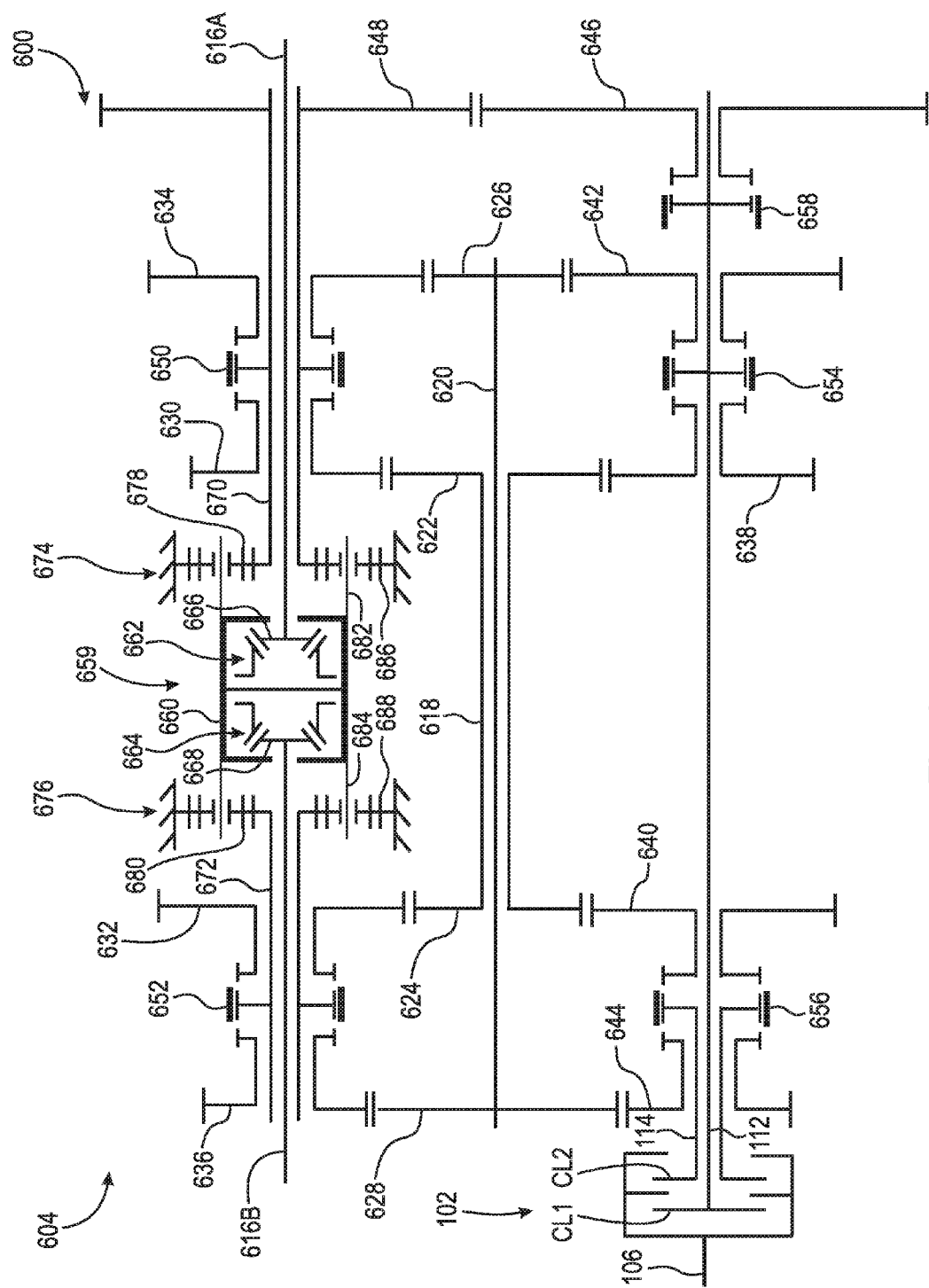
FIG. 6 is a schematic diagram of a transmission assembly with dual outputs, an on-board differential gear assembly, two planetary gear sets, eight forward speeds and three reverse speeds.

FIG. 6 is a schematic diagram of a transmission assembly with dual outputs, an on-board differential gear assembly, two on-board planetary gears sets, eight forward speeds and three reverse speeds. Assembly 600 includes dual clutch assembly 102 and transmission 604.

Assembly 600 includes dual clutch assembly 102 and transmission 604. Transmission 604 includes input shaft 112 connected to clutch CL1 and input shaft 114 connected to clutch CL2. When clutch CL1 is closed, torque is transmitted from shaft 106 to shaft 112 via clutch CL1. When clutch CL2 is closed, torque is transmitted from shaft 106 to shaft 114 via clutch CL2.

Transmission 604 includes: output shafts 616A and 616B; lay shafts 618, 620, 670, and 672; gears 622 and 624 non-rotatably connected to shaft 618; gears 626 and 628 non-rotatably connected to shaft 620; gears 630, 632, 634, 636, 638, 640, 642, 644, and 646; and reverse gear 648 non-rotatably connected to shaft 670. Transmission 604 includes synchronizer clutches 650, 652, 654, 656, and 658.

Gear 622 is meshed with gears 630 and 638; gear 624 is meshed with gears 632 and 640; gear 626 is meshed with gears 634 and 642; gear 628 is meshed with gears 636 and 644; and gears 646 and 648 are meshed.

Clutch 650 is arranged to non-rotatably connect gears 630 and 634 to shaft 670; clutch 652 is arranged to non-rotatably connect gears 632 and 636 to shaft 672; clutch 654 is arranged to non-rotatably connect gears 638 and 642 to shaft 112; clutch 656 is arranged to non-rotatably connect gears 640 and 644 to shaft 114; and clutch 658 is arranged to non-rotatably connected gear 646 to shaft 112.

Transmission 604 includes: differential 659 with casing 660 driven by shafts 670 and 672; planetary gear sets 662 and 664 in differential 659; and gears 666 and 668 arranged to drive shafts 616A and 616B, respectively. Transmission 604 includes planetary gears sets 674 and 676 with sun gears 678 and 680, respectively, planetary carriers 682 and 684, respectively, and ring gears 686 and 688, respectively. Sun gears 678 and 680 are non-rotatably connected to shafts 670 and 672, respectively. Carriers 682 and 684 are arranged to drive casing 660. Ring gears 686 and 688 are grounded. Thus, torque applied to either of shafts 670 or 672 is transmitted to both of shafts 616A and 616B via differential 659. Gears sets 674 and 676 each provide final drive gear ratio options.

Assembly 600 is arranged to provide gear ratios as follows. In the description that follows it should be understood that unless designated otherwise, a synchronizer clutch is open.

1. First forward gear ratio: Close clutch CL1. Close clutch 654 to non-rotatably connect gear 642 to shaft 112 and close clutch 652 to non-rotatably connected gear 636 to shaft 672.

2. Second forward gear ratio: Close clutch CL2. Close clutch 656 to non-rotatably connect gear 644 to shaft 114 and close clutch 652 to non-rotatably connected gear 636 to shaft 672.

3. Third forward gear ratio: Close clutch CL1. Close clutch 654 to non-rotatably connect gear 642 to shaft 112 and close clutch 650 to non-rotatably connected gear 634 to shaft 670.

4. Fourth forward gear ratio: Close clutch CL2. Close clutch 656 to non-rotatably connect gear 644 to shaft 114 and close clutch 650 to non-rotatably connected gear 634 to shaft 670.

5. Fifth forward gear ratio: Close clutch CL1. Close clutch 654 to non-rotatably connect gear 638 to shaft 112 and close clutch 652 to non-rotatably connected gear 632 to shaft 672.

6. Sixth forward gear ratio: Close clutch CL2. Close clutch 656 to non-rotatably connect gear 640 to shaft 114 and close clutch 652 to non-rotatably connected gear 532 to shaft 672.

7. Seventh forward gear ratio: Close clutch CL1. Close clutch 654 to non-rotatably connect gear 638 to shaft 112 and close clutch 650 to non-rotatably connected gear 630 to shaft 670.

8. Eighth forward gear ratio: Close clutch CL2. Close clutch 656 to non-rotatably connect gear 640 to shaft 114 and close clutch 650 to non-rotatably connected gear 630 to shaft 670.

9. First reverse gear ratio: Close clutch CL2. Close clutch 656 to non-rotatably connect gear 644 to shaft 114, close clutch 654 to non-rotatably connect gear 642 to shaft 112, and close clutch 658 to non-rotatably connect gear 646 to shaft 112 and close clutch 650 to non-rotatably connected gear 634 to shaft 670.

10. Second reverse gear ratio: Close clutch CL1. Close clutch 656 to non-rotatably connect gear 644 to shaft 114, close clutch 658 to non-rotatably connect gear 646 to shaft 112, and close clutch 650 to non-rotatably connected gear 634 to shaft 670.

11. Third reverse gear ratio: Close clutch CL2. Close clutch 656 to non-rotatably connect gear 640 to shaft 114, close clutch 654 to non-rotatably connect gear 638 to shaft 112, and close clutch 658 to non-rotatably connect gear 646 to shaft 112 and close clutch 650 to non-rotatably connected gear 634 to shaft 670.

Figure 7:
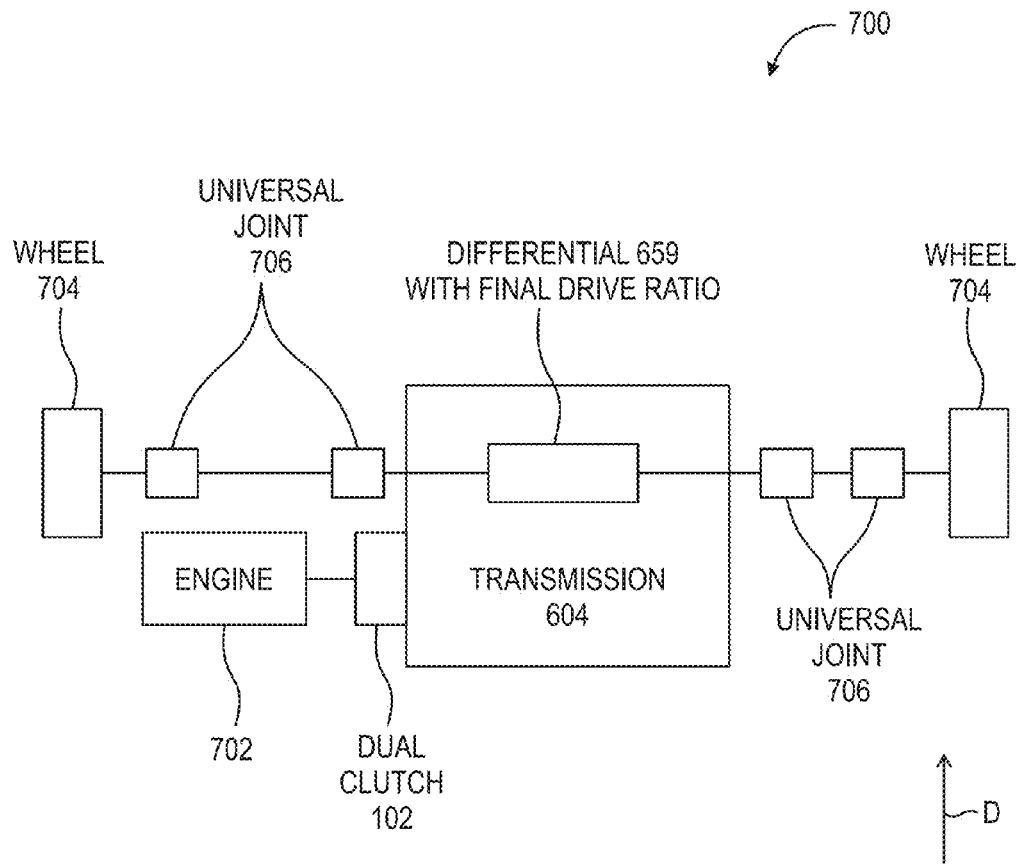
FIG. 7 is a schematic block diagram of a front-wheel drive power train with a transmission having with dual outputs, an on-board differential, and final drive ratio.
Figure 10:
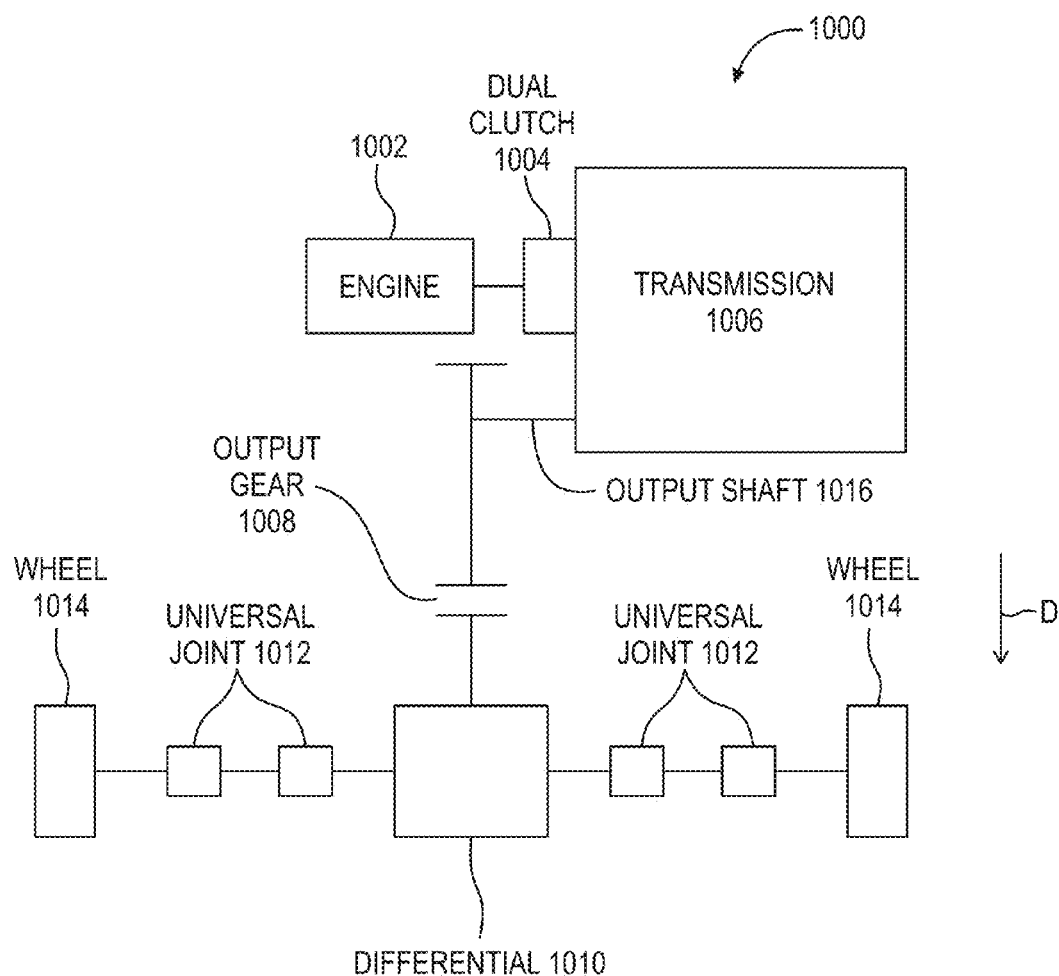
FIG. 10 is a schematic block diagram of a prior art front-wheel drive power train.

FIG. 7 is a schematic block diagram of front-wheel drive power train 700 with a transmission having dual outputs, an on-board differential, and final drive ratio. Power train 700 includes engine 702, front wheels 704, and universal joints 706. In one example, power train 700 includes transmission 604. Clutch assembly 102 connects engine 702 to the transmission. Transmission 604 transmits torque from the engine to the wheels with the final drive ratio. Advantageously, in comparison to power train 1000 in FIG. 10, Power train 700 does not require a differential gear outside of the transmission and as a consequence, the space required for power train 700 in direction D is reduced. In one example, transmission 504 is used in drive power train 700 by installing respective output gears between the transmission and each of the front wheels to provide the final gear ratio.

Figure 8:
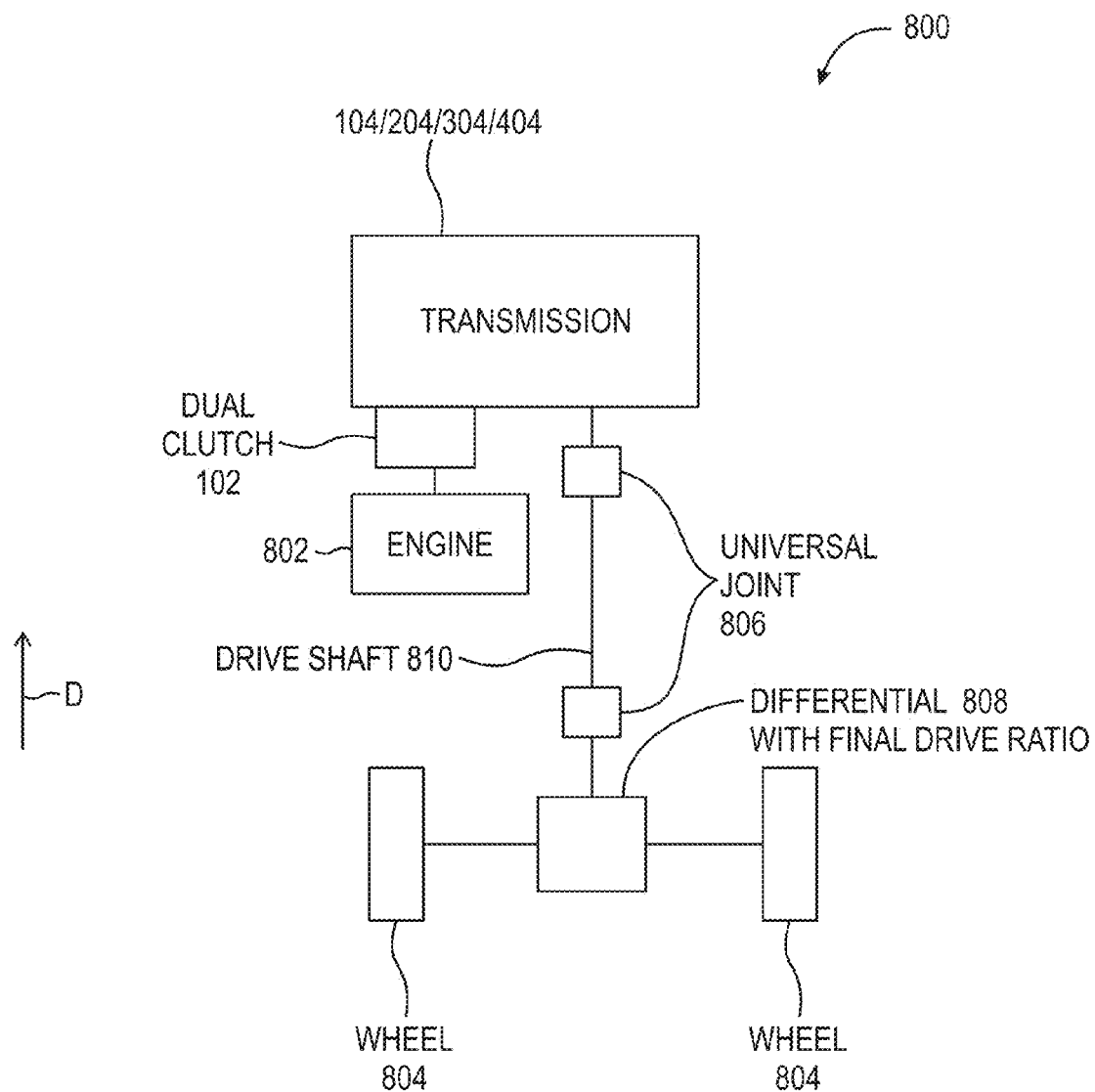
FIG. 8 is a schematic block diagram of an rear-wheel drive power train with a transmission having dual outputs.
Figure 11:
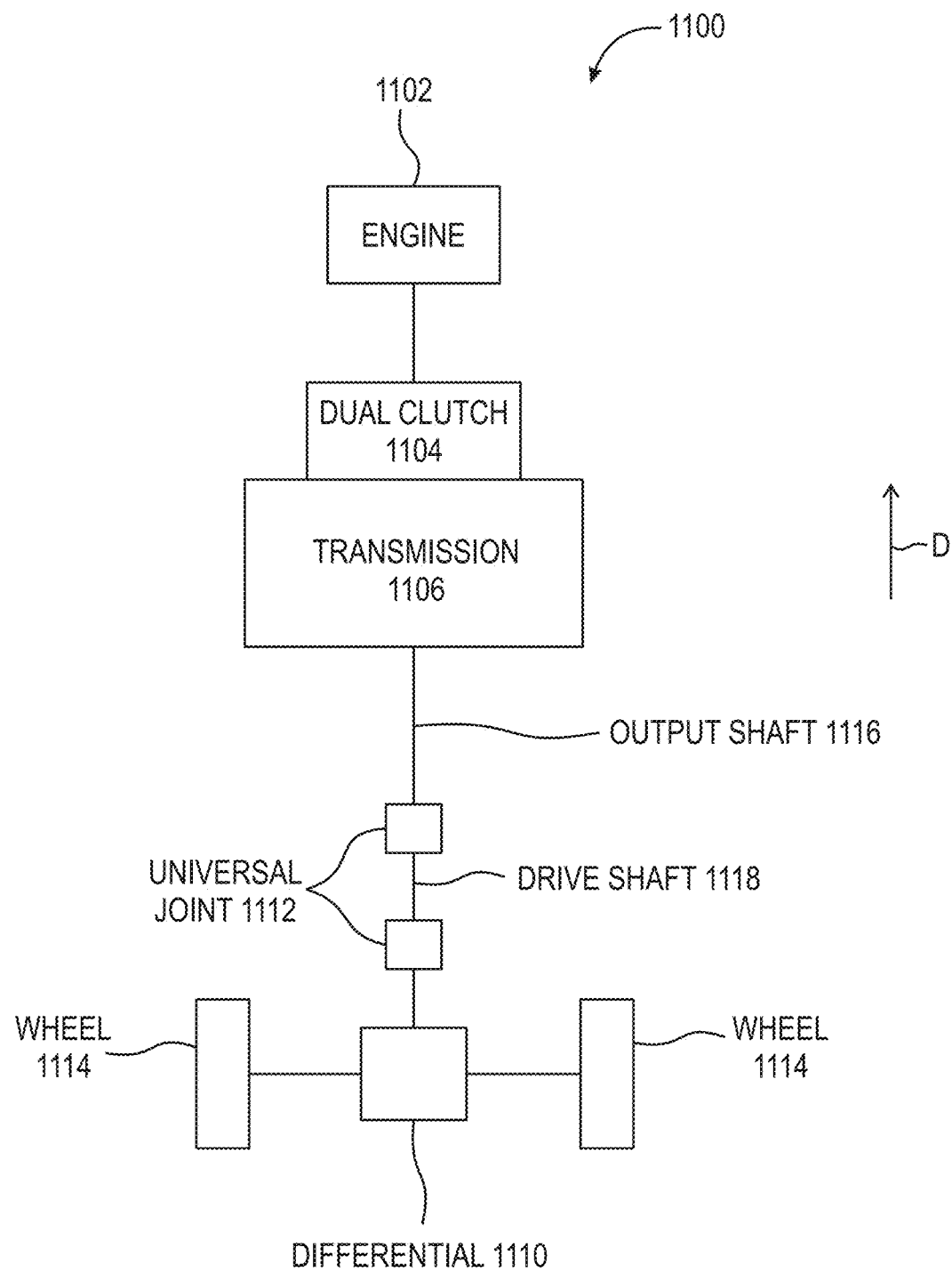
FIG. 11 is a schematic block diagram of a prior art rear-wheel drive power train; and, FIG. 12 is a schematic block diagram of a prior art all-wheel drive power train.

FIG. 8 is a schematic block diagram of rear-wheel drive power train 800 with a transmission having dual outputs. Power train 800 includes engine 802, rear wheels 804, universal joints 806, differential gear 808, and drive shaft 810. In one example, power train 800 includes one of transmissions 104, 204, 304, or 404. Clutch assembly 102 connects engine 802. Advantageously, in comparison to power train 1100 in FIG. 11, Power train 800 requires less space in direction D, since the clutch input and output shafts are not co-linear as in FIG. 11. In one example (not shown), power train 800 includes transmission 504. In one example (not shown), power train 800 includes transmission 604 providing the final drive ratio. In this example, differential 808 no longer provides the final drive ratio.

Figure 9:
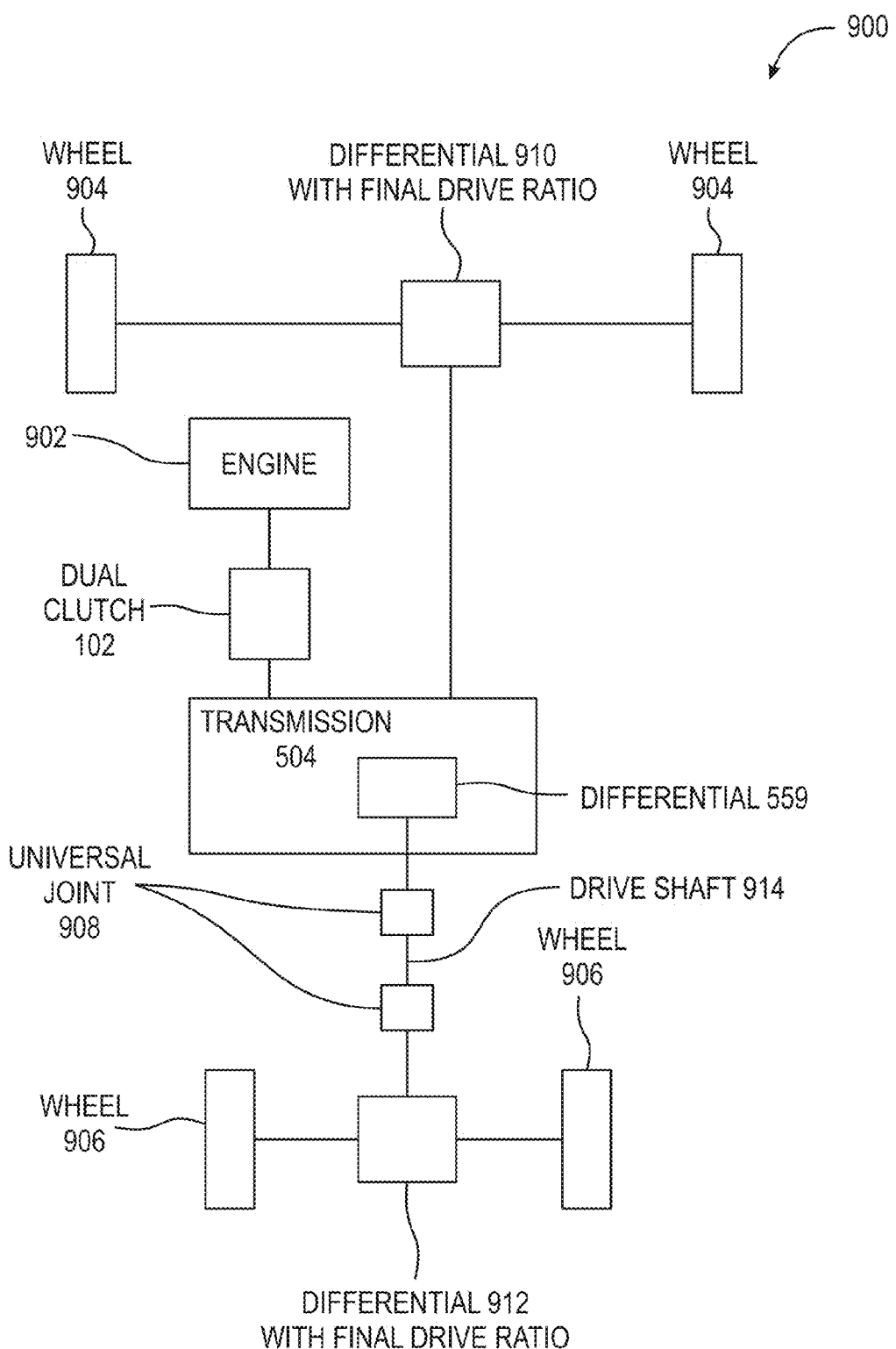
FIG. 9 is a schematic block diagram of an all-wheel drive power train with dual outputs and a transmission having an on-board differential.
Figure 12:
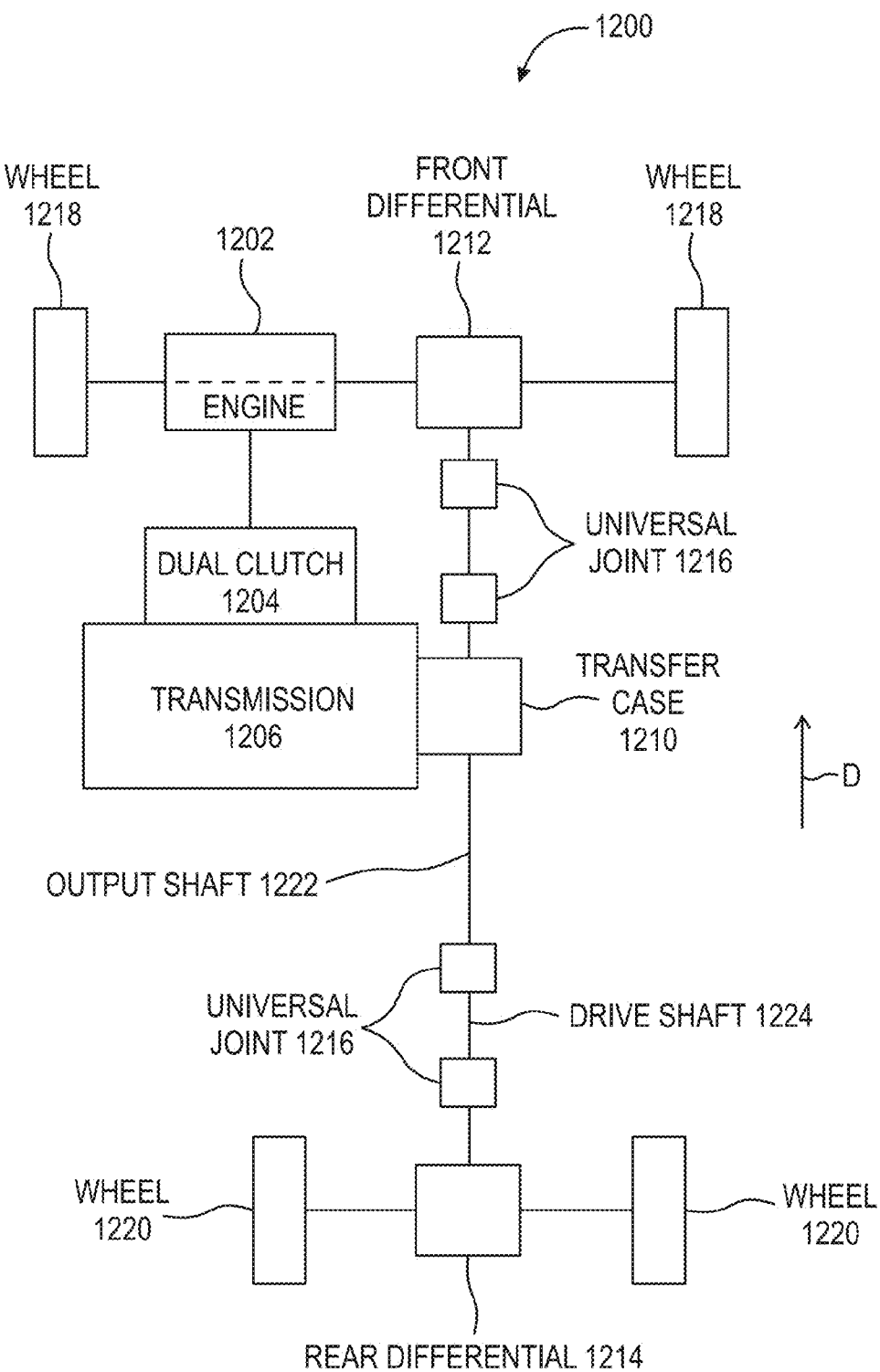

FIG. 9 is a schematic block diagram of all-wheel drive power train 900 with a transmission having dual outputs, an on-board differential, and final drive ratio. Power train 900 includes engine 902, front wheels 904, rear wheels 906, universal joints 908, front differential gear 910, rear differential gear 912, and drive shaft 914. In one example, power train 900 includes transmission 504. To simplify presentation, universal joints between gear 910 and wheels 904 are not shown. Clutch assembly 102 connects engine 902 to the transmission. Transmission 504 transmits torque from the engine to wheels 904 and 906 and differential gears 910 and 912 provide the respective final drive ratios. Advantageously, in comparison to power train 1200 in FIG. 12, Power train 900 eliminates the need for the transfer case and the components connecting the transfer case to gear 1212. In one example (not shown) power train 900 includes one of transmissions 104, 204, 304, or 404 with a differential between the transmission and one of differential gear 910 or 912. In one example (not shown), power train 900 includes transmission 604. In this example, differentials 910 and 912 no longer provide the respective final drive ratios.

Advantageously, transmissions 104, 204, 304, 404, 504 and 604 offer a degree of modularity not found in known transmissions. For example, as described for FIGS. 7 through 9, the same transmission 604 can be used in each of front-wheel, rear-wheel and all-wheel drive power trains. Transmission 504 also can be used in each of front-wheel, rear-wheel and all-wheel drive power trains with the considerations noted above. Transmissions 104, 204, 304, 404, and 504 can be used in a rear-wheel and all-wheel drive power trains with the considerations noted above. This modularity offers advantages by: reducing manufacturing cost and complexity for transmission manufacturers and OEMs; reducing inventory requirements and standardizing power train configurations for vehicle manufacturers; and reducing stocking requirements and standardizing repair procedures for vehicle repair facilities.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A transmission, comprising:
first and second input shafts rotatable about a first axis of rotation;
at least one output shaft rotatable about at least one second axis of rotation, the at least one second axis of rotation non-collinear with the first axis of rotation;
a plurality of lay shafts;
a plurality of gears; and,
a plurality of half synchronizer clutches arranged to:
non-rotatably connect at least a portion of the plurality of gears to the plurality of lay shafts to transmit respective torque from the first and second input shafts to the at least one output shaft; and,
disconnect the at least a portion of the plurality of gears from the plurality of lay shafts, wherein:
the at least one output shaft includes:
a first longitudinal end:
extending past the plurality of gears in a first direction parallel to the at least one second axis of rotation; and,
arranged to transmit torque from the transmission to at least one first component located outside of the transmission;
a second longitudinal end:
extending past the plurality of gears in a second direction, opposite the first direction; and,
arranged to transmit torque from the transmission to at least one second component, different from the at least one first component, located outside of the transmission.

2. The transmission of claim 1, wherein the torque transmitted from the second longitudinal end does not pass through the first longitudinal end.

3. The transmission of claim 1, wherein:
the at least one output shaft consists of a single output shaft;
the at least one second axis of rotation consists of a single second axis of rotation;
the at least one first component is one of a universal joint or a differential gear; and,
the at least one second component is another of the universal joint or the differential gear.

4. The transmission of claim 1, further comprising:
a casing, wherein:
the respective pluralities of lay shafts, gears and half synchronizer clutches are located within the casing;
at least a portion of the at least one output shaft is located within the casing; and,
the first and second longitudinal ends extend beyond an outer surface of the casing in the first and second directions, respectively.

5. The transmission of claim 1, wherein:
the plurality of lay shafts includes a first lay shaft;
the plurality of gears includes:
first and second gears non-rotatably connected to the first lay shaft; and,
third and fourth gears meshed with the first and second gears, respectively, so that the first and third gears rotate in unison and the second and fourth gears rotate in unison;
the plurality of half synchronizer clutches includes:
a first half synchronizer clutch arranged to non-rotatably connect the third gear to the at least one output shaft; and, a second half synchronizer clutch arranged to non-rotatably connect the fourth gear to the at least one output shaft.

6. The transmission of claim 5, wherein:
the plurality of lay shafts includes a second lay shaft;
the plurality of gears includes:
fifth and sixth gears non-rotatably connected to the second lay shaft; and,
seventh and eighth gears meshed with the fifth and sixth gears, respectively so that the fifth and seventh gears rotate in unison and the sixth and eighth gears rotate in unison; and,
the plurality of half synchronizer clutches includes a third half synchronizer clutch, the transmission further comprising:
a first full synchronize clutch including the first and third half synchronizer clutches, wherein:
the third half synchronizer clutch is arranged to non-rotatably connect the seventh gear to the at least one output shaft; and,
the second half synchronizer clutch is arranged to non-rotatably connect the eighth gear to the at least one output shaft.

7. The transmission of claim 6, wherein:
the at least one output shaft consists of a single output shaft;
the plurality of gears includes:
a reverse gear non-rotatably connected to the single output shaft; and,
a ninth gear meshed with the reverse gear so that the ninth and reverse gears rotate in unison; and,
the plurality of half synchronizer clutches includes a fourth half synchronizer clutch arranged to non-rotatably connect the ninth gear to the first input shaft.

8. The transmission of claim 7, wherein:
the plurality of gears includes tenth, eleventh, twelfth and thirteenth gears meshed with the first, second, fifth and sixth gears, respectively, so that the tenth, eleventh, twelfth and thirteenth gears rotate in unison and the second and fourth gears rotate in unison with the first, second, fifth and sixth gears, respectively; and,
the plurality of half synchronizer clutches includes:
a fifth half synchronizer clutch arranged to non-rotatably connect the tenth and twelfth gears to the first input shaft; and,
a sixth half synchronizer clutch arranged to non-rotatably connect the eleventh and thirteenth gears to the second input shaft.

9. The transmission of claim 1, further comprising:
a casing; and,
a differential gear assembly located within the casing, wherein:
the respective pluralities of lay shafts, gears and half synchronizer clutchesare located within the casing;
the at least one output shaft includes:
a first output shaft including the first longitudinal end; and,
a second output shaft, separate from the first output shaft, including the second longitudinal end;
the differential gear assembly is arranged to transmit the respective torque from the first and second input shafts to the first and second output shafts.

10. The transmission of claim 9, further comprising:
first and second planetary gear sets are arranged to transmit the respective torque from the first and second input shafts to the differential gear assembly.

11. A transmission, comprising:
a casing;
a first input shaft rotatable about a first axis of rotation;
a second input shaft, different from the first input shaft,
a plurality of lay shafts located within the casing;
a plurality of gears located within the casing;
a plurality of half synchronizer clutches located within the casing and arranged to:
non-rotatably connect at least a portion of the plurality of gears to the plurality of lay shafts; and,
disconnect the at least a portion of the plurality of gears from the plurality of lay shafts;
first and second output shafts; and,
a differential gear assembly located within the casing and arranged to transmit respective torque from the first or second input shafts to the first and second output shafts.

12. The transmission of claim 11, wherein:
the differential gear assembly includes:
a housing;
a first planetary gear set located within the housing and arranged to transmit the respective torque to the first output shaft; and,
a second planetary gear set located within the housing and arranged to transmit the respective torque to the second output shaft; and,
the plurality of lay shaft includes first and second lay shafts arranged to transmit torque to the housing.

13. The transmission of claim 12, wherein the housing is arranged to transmit the respective torque to the first and second planetary gear sets.

14. The transmission of claim 11, further comprising:
first and second planetary gear sets, wherein:
the plurality of lay shafts includes:
a first lay shaft arranged to transmit the respective torque to the first planetary gear set; and,
a second lay shaft arranged to transmit the respective torque to the second planetary gear set; and,
the first and second planetary gear sets are arranged to transmit the respective torque to the differential gear assembly.

15. The transmission of claim 14, wherein the differential gear assembly includes:
a housing;
a third planetary gear set located within the housing and arranged to transmit the respective torque from the first or second planetary gear set to the first output shaft; and,
a fourth planetary gear set located within the housing and arranged to transmit the respective torque from the first or second planetary gear set to the second output shaft.

16. The transmission of claim 11, wherein:
the plurality of lay shafts includes a first lay shaft;
the plurality of gears includes:
first and second gears non-rotatably connected to the first lay shaft; and,
third and fourth gears meshed with the first and second gears, respectively, so that the first and second gears rotate in unison with the third and fourth gears, respectively;
the plurality of half synchronizer clutches includes:
a first half synchronizer clutch arranged to non-rotatably connect the third gear to the first output shaft; and,
a second half synchronizer clutch arranged to non-rotatably connect the fourth gear to the second output shaft.

17. The transmission of claim 16, wherein:

the plurality of lay shafts includes a second lay shaft;

the plurality of gears includes:

fifth and sixth gears non-rotatably connected to the second lay shaft; and, seventh and eighth gears meshed with the fifth and sixth gears, respectively, so that the fifth and sixth gears rotate in unison with the seventh and eighth gears, respectively;

the first half synchronizer clutch is arranged to non-rotatably connect the seventh gear to the first output shaft; and, the second half synchronizer clutch is arranged to non-rotatably connect the eighth gear to the second output shaft.

18. The transmission of claim 17, wherein:

the plurality of gears includes ninth, tenth, eleventh and twelfth gears meshed with the first, second, fifth and sixth gears, respectively so that the ninth, tenth, eleventh and twelfth gears rotate in unison with the first, second, fifth and sixth gears, respectively; and, the plurality of half synchronizer clutches includes:

a third half synchronizer clutch arranged to non-rotatably connect the ninth and eleventh gears to the first input shaft; and, a fourth half synchronizer clutch arranged to non-rotatably connect the tenth and twelfth gears to the second input shaft.

19. The transmission of claim 11, wherein:

the first and second output shafts are rotatable about second and third axis of rotation, respectively; and, the first axis of rotation is non-collinear with at least one of the second or third axis of rotation; or, wherein:

the plurality of lay shafts includes a first lay shaft arranged to arranged to transmit the respective torque to the differential gear assembly;

the plurality of gears includes:

a reverse gear non-rotatably connected to the first lay shaft; and, a first gear meshed with the reverse gear so that the first and reverse gears rotate in unison; and, the plurality of half synchronizer clutches includes a first half synchronizer clutch arranged to non-rotatably connect the first gear to the first input shaft.

20. A transmission, comprising:

a casing;

first and second input shafts rotatable about a first axis of rotation;

first and second output shafts;

a differential gear assembly wholly located within the casing and arranged to transmit respective torque from the first and second input shafts to the first and second output shafts;

first and second planetary gears sets arranged to transmit the respective torque to the differential gear assembly;

a plurality of lay shafts located within the casing and including:

a first lay shaft arranged to transmit the respective torque to the first planetary gears set; and, a second lay shaft arranged to transmit the respective torque to the second planetary gears set; and, a plurality of half synchronizer clutches located within the casing and arranged to:

non-rotatably connect at least a portion of the plurality of gears to the plurality of lay shafts to transmit the respective torque to the plurality of lay shafts; and, disconnect the at least a portion of the plurality of gears from the plurality of lay shafts.

* * * * *